(12) United States Patent
Gremmert

(10) Patent No.: US 7,734,411 B2
(45) Date of Patent: Jun. 8, 2010

(54) PREDICTED PATH SELECTION SYSTEM AND METHOD FOR HAZARD CODING IN SELECTIVELY CONSTRAINED AIRCRAFT CONTROL SYSTEMS

(75) Inventor: Scott R. Gremmert, Redmond, WA (US)

(73) Assignee: Honeywell International Inc., Morristown, NJ (US)

( * ) Notice: Subject to any disclaimer, the term of this patent is extended or adjusted under 35 U.S.C. 154(b) by 960 days.

(21) Appl. No.: 11/367,532

(22) Filed: Mar. 3, 2006

(65) Prior Publication Data

US 2007/0208465 A1    Sep. 6, 2007

(51) Int. Cl.
G01C 21/00 (2006.01)
(52) U.S. Cl. .............................. 701/202; 701/209; 701/4
(58) Field of Classification Search ...................... 701/3, 701/9, 14, 202, 209, 301
See application file for complete search history.

(56) References Cited

U.S. PATENT DOCUMENTS

| | | | |
|---|---|---|---|
| 5,884,223 A | 3/1999 | Tognazzini | |
| 5,892,462 A * | 4/1999 | Tran | 340/961 |
| 6,289,277 B1 | 9/2001 | Feyereisen et al. | |
| 6,700,482 B2 | 3/2004 | Ververs et al. | |
| 6,744,382 B1 | 6/2004 | Lapis et al. | |
| 7,194,353 B1 * | 3/2007 | Baldwin et al. | 701/206 |
| 2002/0149599 A1 | 10/2002 | Dywer et al. | |
| 2006/0025898 A1 * | 2/2006 | Charles | 701/3 |

* cited by examiner

*Primary Examiner*—Mark Hellner
*Assistant Examiner*—Helal A Algahaim
(74) *Attorney, Agent, or Firm*—Black Lowe & Graham PLLC

(57) ABSTRACT

A surveillance system detects potential hazards and alerts the pilot to them. The alerts can be modified to indicate proximity to the predicted path of the aircraft. An autopilot receives instructions from a flight management system (FMS) regarding a planned path and is subject to constraints preempting the planned path. The surveillance system selects which of the planned and a constrained path will be followed for alerting and hazard coding purposes. Means are disclosed to determine when the constrained path will be followed by evaluating the current position of an aircraft, the planned path, and the constraint data.

6 Claims, 6 Drawing Sheets

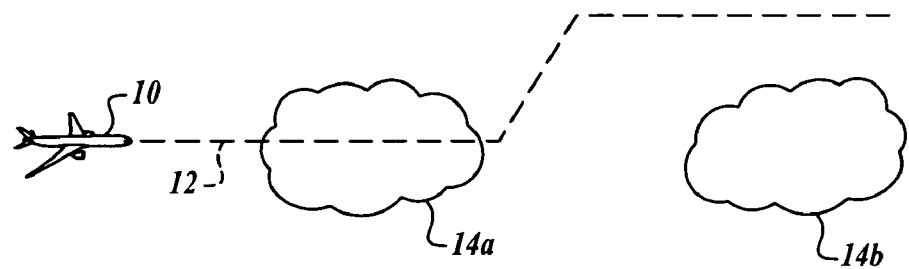
FIG. 1 *(PRIOR ART)*
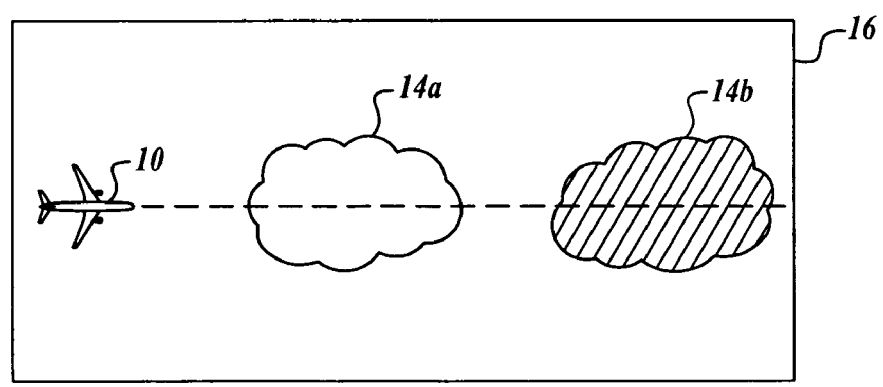
FIG. 2 *(PRIOR ART)*

PREDICTED PATH SELECTION SYSTEM AND METHOD FOR HAZARD CODING IN SELECTIVELY CONSTRAINED AIRCRAFT CONTROL SYSTEMS

CROSS-REFERENCE TO RELATED APPLICATIONS

This application is related to Nonprovisional application Ser. No. 11/364,066 filed Feb. 28, 2006 and entitled PREDICTED PATH SELECTION SYSTEM AND METHOD FOR HAZARD CODING IN SELECTIVELY CONSTRAINED AIRCRAFT CONTROL SYSTEMS, which is hereby incorporated by reference.

BACKGROUND OF THE INVENTION

Modern aircraft are typically flown by a computerized autopilot (AP) The AP interfaces with Flight Control computers that are coupled both to actuators coupled to control surfaces and to engine computers such as a fully automated digital control (FADEC) computer. Together these cause the aircraft to follow a prescribed path and to maintain proper lift. A navigational computer or flight management system (FMS) receives pilot input regarding intended lateral path to a destination and either receives a vertical flight plan or develops the vertical flight plan based on pilot input, the present position and condition of the aircraft, and current flying conditions such as wind. The vertical and lateral flight paths are typically represented as a series of interconnected waypoints describing a path between points of departure and arrival. The FMS directs the AP to pilot the aircraft according to the flight plan.

In some instances, constraints are input to the AP based on instructions from ground based air traffic control (ATC) systems constraining the flight path of the aircraft. These constraints are typically an altitude ceiling above which the aircraft is not permitted to fly or an altitude floor above which an aircraft must fly. The constraints preempt control of the AP by the FMS. The FMS may nonetheless direct the AP to the extent a planned flight path does not conflict with AP constraints.

A surveillance system monitors hazards around the airplane and along a predicted flight path. Hazards include weather systems, turbulence, mountains, other aircraft, volcanic ash, and the like. The location of hazards is displayed to the operator of the aircraft (whether onboard or remote) by means of a screen or heads up display in the cockpit. Hazards may be displayed in a navigational, or plan, display illustrating the horizontal position of the aircraft and hazards. Hazards may also be displayed in a "vertical" display, showing the position of the aircraft and hazards in a vertical plane.

In the navigational display, it may not be immediately apparent that an aircraft's altitude carries it above or below a hazard such that the hazard does not require attention. Likewise, in the vertical display hazards are not apparent that are slightly to one side or the other horizontally from the aircraft's flight path. In some systems, the surveillance system visually distinguishes symbology representing hazards according to whether the hazards lie along a predicted flight path, or within a specific tolerance of a predicted flight path. Distinctive representation of hazards enables a pilot to focus attention on hazards likely to be encountered by the aircraft. For example, in FIG. 1, the aircraft 10 flying along the predicted flight path 12 is likely to encounter hazard 14a whereas hazard 14b does not lie on the predicted flight path. Accordingly, a navigational display 16 might appear as in FIG. 2 having hazard 14a represented in a solid color whereas hazard 14b is shown with hash marks. Distinctive representation may be accomplished by other markings, fill patterns, colors, and the like. In some systems, a surveillance system is programmed to issue audible, pictorial, and/or textual alerts when a hazard is found to lie along a predicted flight path. Accordingly, the surveillance system distinguishes between on- and off-path hazards when determining whether to issue an alert.

The AP, FMS, surveillance system, and various control panels are typically embodied as discrete autonomous units, interfacing with one another in precisely defined ways. The criticality of each of the components means that each must be carefully tested and certified by regulatory agencies before being approved for installation. Modification of the components requires similar testing and regulatory approval. Modification of the AP and associated control panels in particular is an extremely complicated and expensive process because its role in control of the aircraft is so vital.

In one system, the surveillance system receives the planned flight path determined by the FMS. The surveillance system may also be notified of any constraint that has been imposed, such as an altitude ceiling or floor, though in some systems no notice is given and imposition of the constraint is detected by other means. The surveillance system does not receive notice when the constraint ceases to be active. Accordingly, the surveillance system is unable to determine when the aircraft is no longer subject to the constraint and is therefore unable to determine whether the predicted flight path will follow the constrained flight path or the unconstrained planned flight path.

This problem arises in the scenario of FIGS. 3A and 3B illustrating a planned flight path 18 in the vertical view. An aircraft 10 may follow an actual path 20 passing through, or "sequencing," a waypoint 22 forming part of the planned path 18 within an area in which a constraint 28, such as an altitude ceiling (FIG. 3A) or an altitude floor (FIG. 3B) is in effect. At point 30, the actual path 20 of the aircraft 10 transitions from following the planned flight path 18 to conform to the constraint 28. At point 32 the aircraft 10, the aircraft 10 begins to follow the planned path 18 and directs itself toward waypoint 34. In FIG. 3A, the aircraft 10 transitions to the planned path 18 because it lies below the constraint 28. In FIG. 3B, the aircraft 10 transitions because the constraint 28 is changed to an altitude lying below the planned path 18. At points 30 and 32 the surveillance system is not notified which path will be followed as the aircraft 10 moves forward. Accordingly, it is not apparent for which of the hazards 14a-14c to provide alerts.

Accordingly, it would be an advancement in the art to provide systems and methods for resolving which of the constrained flight path and unconstrained flight path will be followed by the aircraft. It would be a further advancement in the art to provide such systems that do not require modification of the AP or the FMS.

BRIEF SUMMARY OF THE INVENTION

The present invention selects whether the constrained flight path or unconstrained flight path will be followed by an aircraft by evaluating whether the current location of the aircraft is within a predetermined tolerance of a constrained path, taking into account prior determinations, and predicting an unconstrained path will be followed if the current position is not within the tolerance.

Systems and methods for predicted path selection include a controller, such as an autopilot (AP), directly or indirectly actuating control surfaces and propulsion systems of an aircraft to cause the aircraft to follow an actual path. The controller receives a planned path from a flight planner, such as an FMS. The controller also occasionally receives a constraint from a control panel, such as a Flight Control Unit (FCU) or Mode Control Panel (MCP), constraining the actual path followed by the aircraft in at least one direction, such as the vertical direction. The control panel provides an output indicating what the current constraints are, and the controller or FMS may provide output indicating that a constraint has been imposed. One or more of these outputs are provided to a surveillance system operable to detect hazards and may provide a display visually distinguishing on- and off-path hazards.

In some embodiments, the controller, the FMS, or both, do not provide an output to the surveillance system indicating that a constraint has been imposed. In such embodiments the constraint may be detected by analyzing the altitude history of the aircraft 10 to determine if the aircraft 10 is descending onto a floor or ascending up to a ceiling. For example, if an aircraft 10 that was descending levels off at an altitude, the surveillance system may assume that a floor has been encountered. Likewise, if an aircraft that was ascending levels off at an altitude, the surveillance system may assume that a ceiling has been encountered.

In one embodiment, the surveillance system compares the current location of the aircraft to the constraint. If the separation between current location and the constraint is outside a predetermined tolerance, the surveillance system selects either the planned path or a tactical path as the future path for purposes of distinguishing between on- and off-path hazards. The tactical path is a projection based on the current trajectory of the aircraft. Distinguishing of symbols may be accomplished by representing critical and non-critical hazards with differing colors or line styles or fill patterns. Distinguishing hazards as critical or non-critical may also be used in alerting algorithms.

In one embodiment, the constrained path is selected only if the planned path and the aircraft current location are both either above or below the constraint. In another embodiment, the surveillance system examines whether the aircraft is within a tolerance of either the planned path or the constrained path and selects the planned path or the constrained path if the aircraft lies within tolerance of either. In such embodiments if the aircraft does not lie within tolerance of either, then the surveillance systems selects the tactical path.

As the aircraft continues forward, selections of the predicted path are validated. In one embodiment, if the aircraft has deviated from the constraint in the direction opposite the planned path, perhaps due to wind or fuel burn, the FMS will typically guide the aircraft back toward the original flight plan and back into the constraint. Accordingly, the surveillance system may continue to select the constrained path for strategic purposes (e.g. because the aircraft is not within tolerance of the flight plan), or may choose to switch to a tactical display, based on immediate actual flight path (speed and direction) for the period in which the aircraft deviates from the constraint. As the FMS returns the aircraft to within a certain tolerance of the constraint altitude and the aircraft deviates from the planned path to again follow the constrained path, the surveillance system will again select the constrained path as the future path as well as portions of the planned path that do not violate the constraint. Adequate timeguarding may be used to ensures a smooth and consistent presentation to the crew.

In instances where the aircraft has deviated from the constraint in the direction of the flight plan, perhaps again due to winds or fuel burn, either the AP will force the aircraft back to the constraint altitude, such that the constrained path continues to be used for distinguishing hazards, or else not, in which case the surveillance system will switch to either the planned path or a tactical display, depending on proximity to the FMS flight plan and on timeguarding.

As will be readily appreciated from the foregoing summary, the invention provides a reliable method for selecting which of a planned path and a constrained path will be followed by an aircraft for hazard coding purposes. The above described system does not require modification of the AP or FMS.

BRIEF DESCRIPTION OF THE SEVERAL VIEWS OF THE DRAWING

The preferred and alternative embodiments of the present invention are described in detail below with reference to the following drawings.

FIG. 1 is a side schematic view of an aircraft, flight path, and intervening hazards;

FIG. 2 is an exemplary on-screen representation of coded hazard information;

DETAILED DESCRIPTION OF THE INVENTION

Figure 3A:
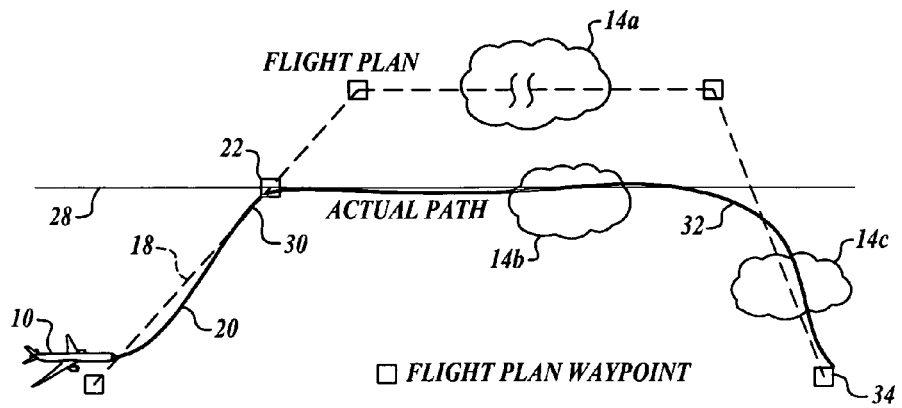
FIGS. 3A and 3B are side schematic views of an aircraft following a flight path subject to a constraint.
Figure 3B:
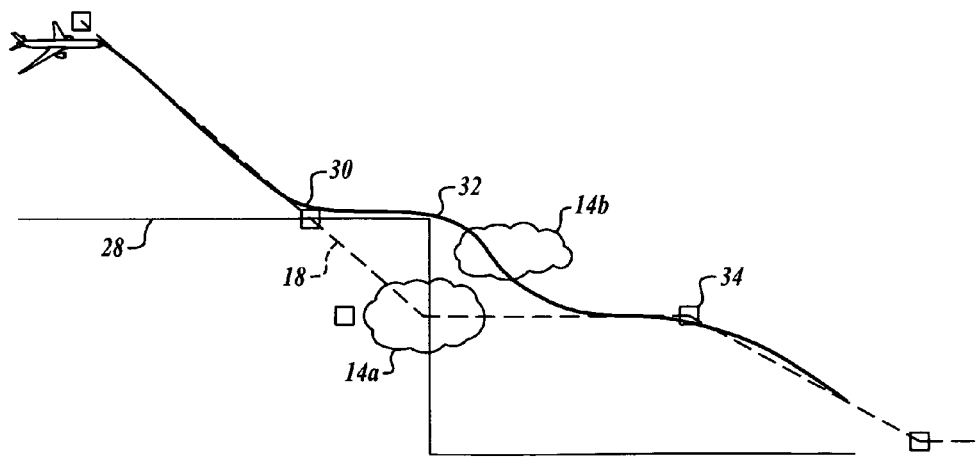
Figure 4:
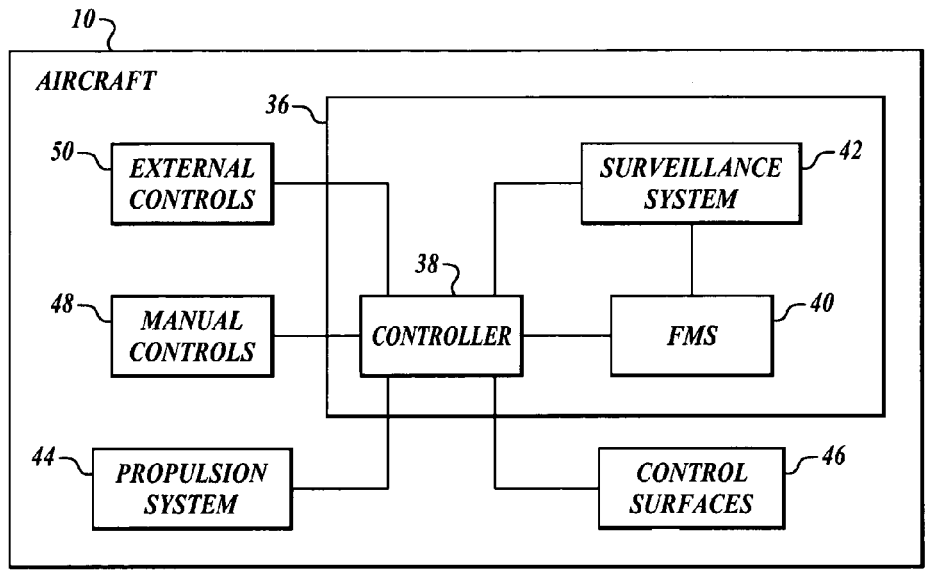
FIG. 4 is a schematic block diagram of components of an avionic control and navigational system formed in accordance with an embodiment of the present invention.

Referring to FIG. 4, in one embodiment an aircraft 10 includes an avionic control system 36, which may include a controller 38, such as an Autopilot (AP) 38, an, FMS 40, and a surveillance system 42. The controller 38 is coupled to the propulsion system 44 and control surfaces 46 of the aircraft 10. The controller 38 is programmed to control the aircraft propulsion systems 44 and control surfaces 46 to achieve a desired trajectory. Manual controls 48 and external controls 50 provide inputs to the controller 38 to provide a trajectory. External controls 50 include directives from systems external to the aircraft 10 such as air traffic control (ATC) or other remote "fly by wire" type systems as may be applicable to manned or unmanned aircraft. The FMS 40 calculates a planned flight path between the current location of the aircraft 10 and a destination and provides a trajectory to the controller 38 to cause the controller 38 to fly the aircraft 10 along the planned flight path. The surveillance system 42 detects hazardous conditions through means such as radar, uploaded weather data, topographical data, air traffic data, and the like. The FMS 40 provides data relating to a planned path to the surveillance system 42 to enable the surveillance system to provide alerts indicating hazards that are located along the planned path or to mark on-path hazards as critical in a strategic display provided to the pilot.

The controller 38 or one of the control panels 48 may provide an input to the FMS 40 and/or surveillance system 42 indicating what the current constraints are. Alternatively, the input is provided to the FMS 40 and the FMS 40 provides an indication that the constraint has become active to the surveillance system 42. In one embodiment, this is accomplished by metadata associated with a waypoint defining a planned flight path provided to the surveillance system 42. The metadata may include a single bit that is set or reset to indicate that a waypoint is a constraint waypoint.

In some embodiments, the surveillance system 42 is not provided notice that a constraint has become active. In such embodiments, the surveillance system 42 may analyze the actual path followed by the aircraft to determine whether a constraint has become active and where the constraint is. For example, the aircraft 10 may ascend according to the planned path 18 and then level off at an altitude not indicated in the planned path 18 as a level off point. The surveillance system 42 may therefore conclude that a constraint has been imposed at the constraint altitude. An altitude floor may be detected in a like manner during descent of the aircraft 10. The surveillance system 42 may also detect imposition of the constraint by analyzing one or more of the actual path of the aircraft 10, the path 18 calculated by the FMS 40, and analysis of flight control laws followed by the FMS, controller 38, and/or other systems within the aircraft 10.

Figure 5:
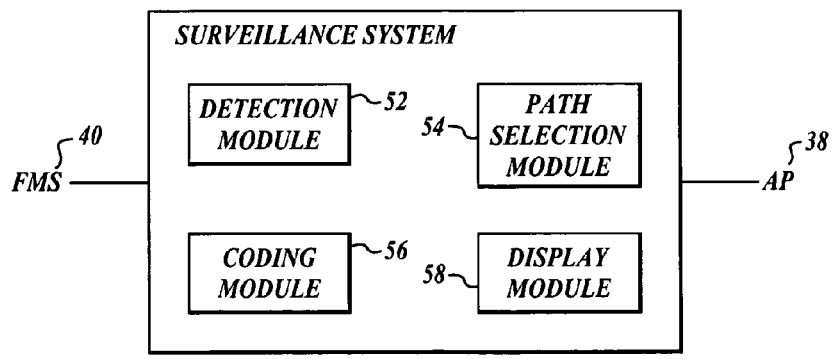
FIG. 5 is a schematic block diagram of a surveillance system suitable for performing predictive flight path selection for hazard coding formed in accordance with an embodiment of the present invention.

Referring to FIG. 5, the surveillance system 42 includes one or more detection modules 52, a path selection module 54, a coding module 56, and a display module 58. A detection module 52 may process radar, uploaded weather, terrain data, air traffic data, and the like in order to evaluate the location of potential hazards. A path selection module 54 determines which of the constrained path and planned path will be used for hazard coding purposes. A coding module 56 determines which of the detected hazards lies along the path selected by the path selection module 54 in order to code symbols as on- or off-path in a symbolic display provided to the pilot. The display module 58 displays coded symbols representing the hazards on a screen or heads-up display. Alternatively, the display module 58 provides visible or audible alerts when a hazard is detected along the selected path. Audible alerts may distinguish alerts for on-path hazards from off-path hazards by means of the volume of the alert, the gender of the speaker, words used in the alert, and the like.

Figure 6:
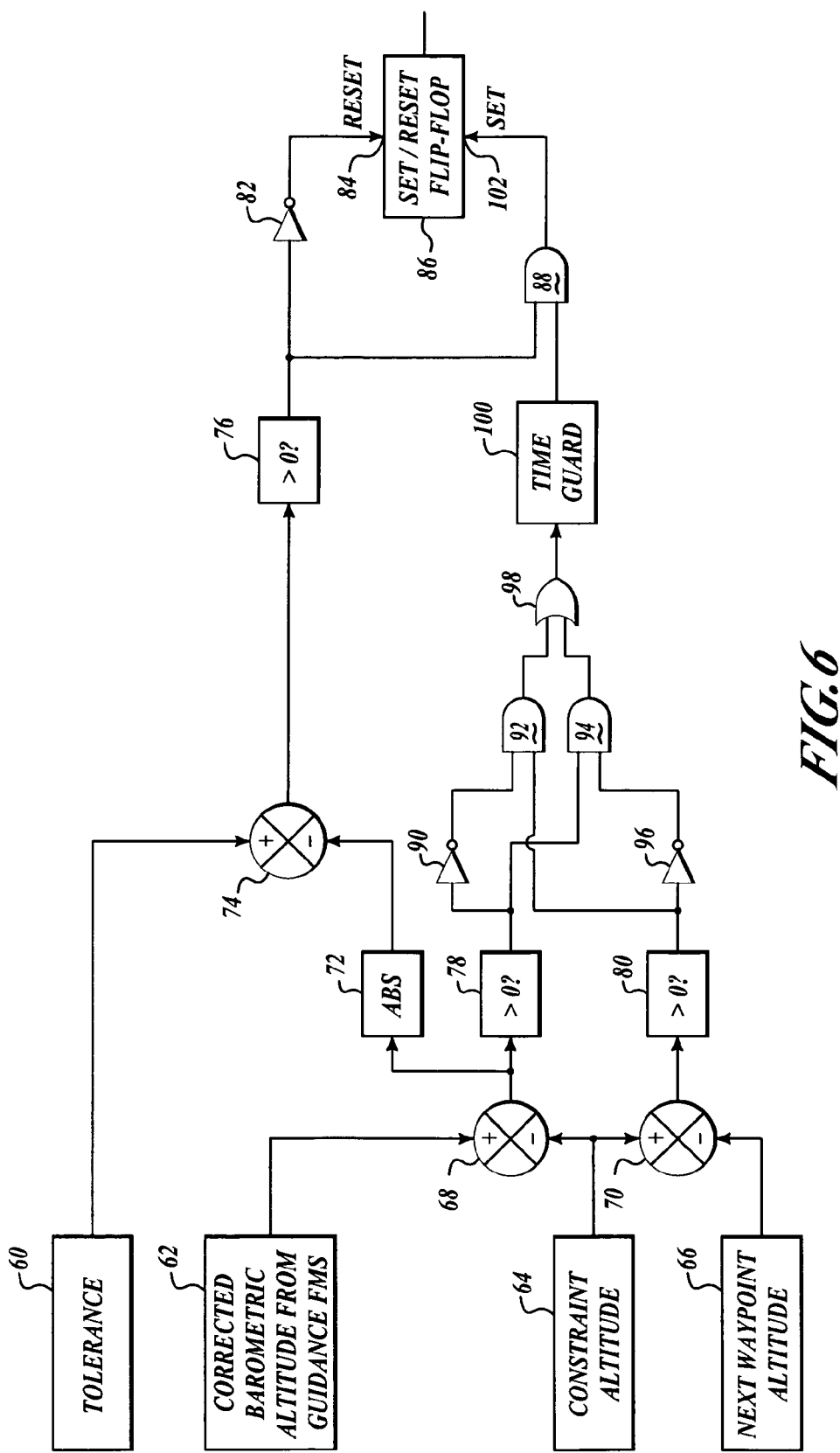
FIG. 6 is a logic diagram of a method for performing predictive flight path selection, in accordance with an embodiment of the present invention.

FIG. 6 is a logic flow diagram implementing a method for selecting a future path for purposes of identifying on- and off-path hazards. Inputs to the logic diagram include a tolerance 60, a current altitude 62, a constraint altitude 64, and an altitude 66 for a waypoint forming part of the planned path, such as the waypoint 34 of FIG. 2. The tolerance 60 may be a navigational tolerance substantially equal to the distance an aircraft 10 can deviate from an intended flight path and still be deemed to be following the flight path. Alternatively, the tolerance may be half, or some other proportion, of the required vertical separation between aircraft under FAA regulations such as the Reduced Vertical Separation Minimum (RVSM) standards. Vertical separations under the RVSM currently range from 500 feet to 1000 feet depending on the altitude.

The difference between the current altitude 80 and the constraint altitude 82 is calculated 68 and the difference between the constraint altitude and the waypoint altitude 66 is calculated 70. The absolute value of the result of the calculation 68 is taken at step 72 and subtracted 74 from the tolerance 60. The result of the calculations 68, 70, 74 are compared to zero at steps 76, 78, and 80, respectively, with values greater than zero resulting in a logical one and values less than zero resulting in a logical zero.

The result of the comparison step 76 is inverted 82 and input to the reset terminal 84 of a set/reset flip-flop 86. The result of the comparison step 76 is also input to an AND gate 88. The result of the comparison step 78 is inverted 90 and input into an AND gate 92. The result of the comparison step 78 is also input to an AND gate 94. The result of the comparison step 80 is input into the AND gate 92. The result of the comparison step 80 is also inverted 96 and input into the AND gate 94. The output of the two AND gates 92, 94 is input to an OR gate 98. The output of the OR gate 98 is input into a time guard 100. The time guard 100 outputs a logical one upon the input of a logical one. However, the time guard 100 outputs a logical zero only upon receiving a logical zero input for a predetermined timer period, such as a five second period. The output of the time guard 100 is input into the AND gate 88 and the output of the AND gate 88 is connected to the set terminal 102 of the set/reset flip-flop 86. A logical one at the output of the set/reset flip-flop 86 indicates to the surveillance system that the constrained path will be followed by the aircraft 10.

In operation, the logic diagram of FIG. 6 causes the surveillance system to use the constrained path and portions of the planned path 18 that do not violate the constraint 28 as the future path if the aircraft 10 has not deviated from the constraint by an amount exceeding the tolerance 60 and if both the next waypoint and the aircraft are above the constraint or if both the next waypoint and the aircraft are below the constraint. The time guard 100 ensures that deviations of short duration will not cause the selected future path to change.

Figure 7:
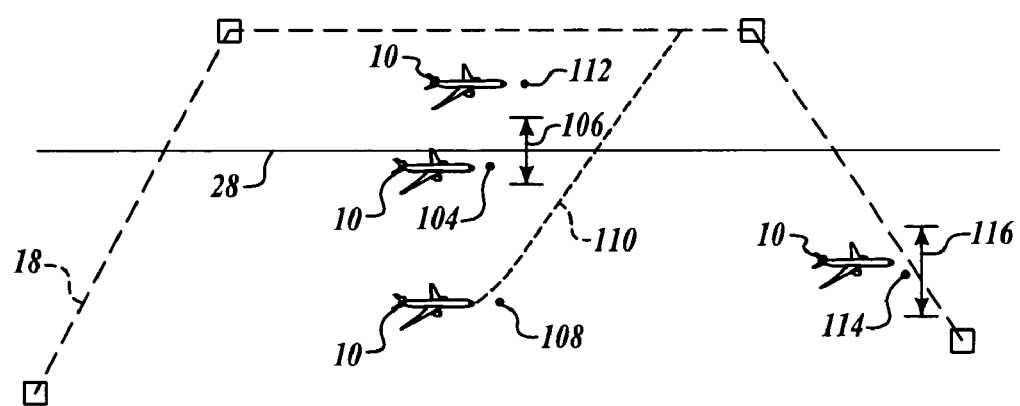
FIG. 7 is a side schematic view of an aircraft and constrained and unconstrained flight paths illustrating alternative methods for future path selection.

Referring to FIG. 7, in an alternative embodiment, the surveillance system 42 selects a future path according to the position of the aircraft 10 relative to the planned path 18 and the constraint 28. At point 168 the aircraft is within a tolerance 106 of the constraint 28, in such instances the constraint altitude is selected by the surveillance system 42 for distinguishing between on- and off-path hazards. At point 108 the aircraft 10 is outside the tolerance of the constraint 28 and has deviated from the constraint 28 away from the planned path 18. At points such as point 108, the FMS 40 typically generates an updated planned path 110 and guides the aircraft 10 back toward the planned path 18 and the constraint 28. In such instances the surveillance system 42 uses a future path for distinguishing between on- and off-path hazards that includes the updated planned path 110 until the point where updated planned path 110 intersects the constraint altitude 28. The future path in such instances may also includes the constraint altitude 28 after the point of intersection of the planned path 18 with the constraint 28 and portions of the planned path 18 below the constraint 28.

At points 112, 114 the aircraft deviates from the constraint 28 in the direction of the planned path 18. In such instances, the surveillance system 42 selects the planned path 18 as the future path for purposes of distinguishing hazards. If in fact, the deviation is due to factors such as fuel burn or wind rather than pilot input or the like, such as at point 112 the controller 38 will force the aircraft 10 back to within the tolerance distance 106 of the constraint 28 such and the surveillance system 42 will select the constrained path as the future path. If deviation toward the planned path 18 is intentional, such as at point 114 where the aircraft 10 is directed toward the waypoint 34, the controller 38 will not cause the aircraft 10 to return to the constraint and the selection of the planned path 18 is validated. Selection of future paths and re-selection in response to changes in aircraft position take place in about the same amount of time it takes to update a display, so adequate time guarding ensures consistent presentation.

In some embodiments, the surveillance system 42 determines whether the aircraft is within a tolerance distance 106 of the constraint 28 or within a tolerance distance 116 of the planned path 18. The surveillance system 42 selects the constrained path if the aircraft 10 is within the tolerance distance 116. The surveillance system 42 selects the planned path 18 as the future path if the aircraft 10 is within the tolerance distance 116 of the planned path 18. In instances where the aircraft 10 is within neither tolerance 106, 116, the surveillance system 42 uses the current trajectory of the aircraft as the future path.

Figure 8:
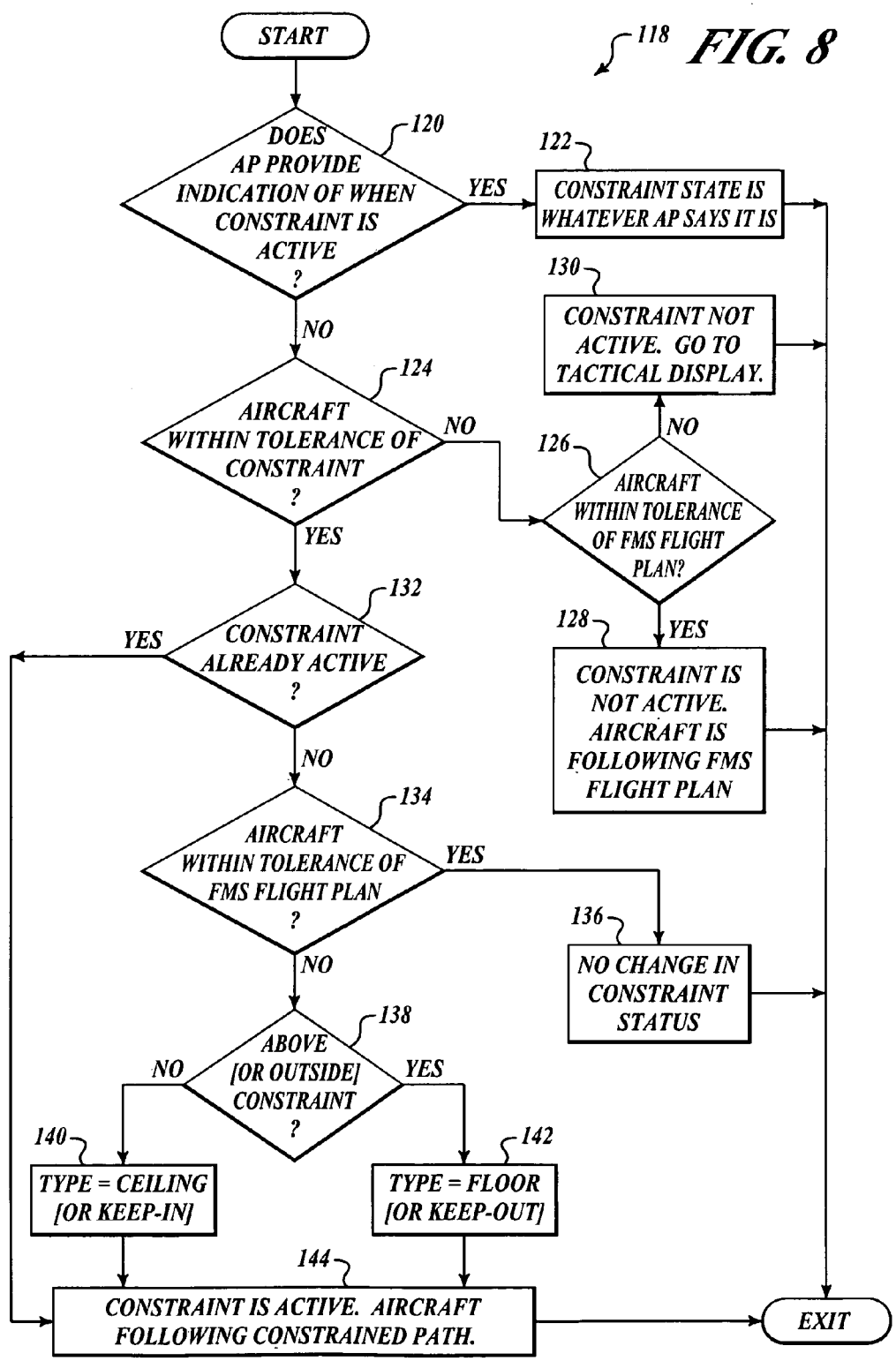
FIG. 8 is a logic diagram of a method for performing predictive flight path selection, in accordance with an embodiment of the present invention.

Referring to FIG. 8, in one embodiment a method 118 may be executed by the surveillance system 42, or other system within the avionic control system 26 to determine which of the planned path 18 and the constraint 28 will be used for purposes of distinguishing hazards. At block 120 the method 118 evaluates whether the controller 38, such as an autopilot (AP) provides an indication of when a constraint 28 has become active. Block 120 may be executed manually or automatically and may be executed at each iteration of the method 118 or only on an initial iteration. For example, a surveillance system 42 installed in an aircraft 10 that does not provide an indication that constraints have become active may be programmed or hardwired such that it is not necessary to execute block 120. If indication is provided, then at block 122 the method 118 includes using whichever path is indicated by the controller 38, whether the constraint 28, planned path 18, or a tactical path.

If the controller 38 does not provide an indication, at block 124, the method 118 includes evaluating whether the aircraft 10 is within a tolerance of a constraint 28 determined by another means, such as by analysis of the flight path followed by the aircraft 10 in view of flight control laws followed by the controller 38.

If the aircraft is not within tolerance of the constraint 28, the method 118 includes evaluating at block 126 whether the aircraft 10 is within a predetermined tolerance of a planned path 18, such as a flight plan generated by the FMS 40. If the aircraft is within the predetermined tolerance of the planned path 18, the constraint 28 is designated not active at block 128 and the planned path 18 is designated as the future path for purposes of distinguishing between on- and off-path hazards. If the aircraft 10 is not within the predetermined tolerance of the planned path 18, then the method 118 includes concluding at block 130 that the constraint 28 is not active and that a, tactical path based on the current trajectory of the aircraft 10 will be used for distinguishing hazards.

If the aircraft 10 is found to lie within the constraint 28 at block 124, then the method 118 includes evaluating at block 132 whether a constraint is already active (e.g. whether in the previous iteration of the method 118 it was determined that a constraint 28 was active). If not, at block 134, the method 118 includes evaluating whether the aircraft 10 is within a predetermined tolerance of the planned path 18, such as a flight plan generated by the FMS 40. If the aircraft 10 is within the predetermined tolerance, then at block 136 whichever path currently being used for distinguishing hazards is deemed the future path for hazard coding, whether it is the planned path 18, constraint 28, or the like.

If the aircraft 10 is found to not lie within the predetermined tolerance of the planned path 18 at block 198, then, whether the aircraft 10 is above the constraint 28 (or outside a horizontal constraint) is evaluated at block 138. Evaluating whether the aircraft 10 is above the constraint 28 may include evaluating from what direction the aircraft approached the constraint 28. Thus the aircraft 10 is deemed to be above the constraint 28 if the aircraft 10 descended to the constraint 28 and is deemed to be below the constraint 28 if the aircraft 10 ascended to the constraint 28. If the aircraft 10 is not above the constraint 28, then the constraint 28 is designated a ceiling (or a keep-in constraint if it is a horizontal constraint) at block 140. If it is above the constraint 28, then the constraint 28 is designated a floor (or a keep-out if it is a horizontal constraint) at block 142. In either case, at block 144 the constraint 28 is designated as active such that it will be used as the future path for purposes of distinguishing between on- and off- path hazards.

Where the planned path 18, such as a flight plan generated by the FMS 42, is selected by the method 118 as the future path it is typically used as the future path until the constraint 28 is selected by the method 118. In either case the planned path 18 will be used as the future path when distinguishing between on- and off-path hazards in the horizontal view.

The method 82 may also include selecting a constraint 28 as the future path in instances where the constraint 28 is not currently active. A constraint 28 will typically also be selected as the future path, or to define a portion of the future path, where a waypoint within the FMS flight path is designated as a constraint waypoint indicating that a constraint 28 will be active starting at that waypoint.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely reference to the claims that follow.

What is claimed is:

1. A method for selecting a predicted path of an aircraft comprising:
    imposing a constraint on an aircraft flight controller;
    detecting the imposition of the constraint;
    detecting hazard locations;
    calculating a planned path;
    detecting an aircraft current location;
    comparing the aircraft current location to the constraint to determine a variation of aircraft current location from the constraint;
    providing alerts of hazards located along a current predicted flight path;
    selecting a constrained path corresponding to the constraint as the current predicted flight path if the aircraft current location is within a constraint tolerance distance from the constraint and outside a flight plan tolerance distance from the planned path;
    selecting the planned path as the current predicted flight path if the aircraft current location is not within the constraint tolerance from the constrained path and is within the flight plan tolerance from the planned path; and selecting a tactical path corresponding to a trajectory of the aircraft if the aircraft current location is not within the constraint tolerance from the constrained path and is not within the flight plan tolerance from the planned path.

2. The method of claim 1, further comprising refraining from changing the current predicted flight plan if the aircraft is both within the constraint tolerance from the constrained path and within the flight plan tolerance from the planned path.

3. The method of claim 1, wherein providing alerts comprises visually displaying relevant symbols representing hazards.

4. The method of claim 3, wherein displaying relevant symbols comprises visually distinguishing the relevant symbols from one or more non-relevant symbols corresponding to hazards not lying on the predicted flight path.

5. The method of claim 1, wherein calculating a planned path comprises repeatedly updating the planned path according to the aircraft current location.

6. The method of claim 1, wherein the constraint is an altitude constraint.

* * * * *